United States Patent [19]
Bohler et al.

[11] Patent Number: 4,735,125
[45] Date of Patent: Apr. 5, 1988

[54] HOLDING APPARATUS FOR WEAPON BARRELS OF A MULTI-BARREL FIRING WEAPON

[75] Inventors: Erwin Bohler, Dübendorf; Werner Bruderer, Zurich, both of Switzerland

[73] Assignee: Werkzeugmaschinenfabrik Oerlikon-Bührle AG, Zurich, Switzerland

[21] Appl. No.: 16,182

[22] Filed: Feb. 17, 1987

[30] Foreign Application Priority Data

Feb. 27, 1986 [CH] Switzerland ............... 00796/86

[51] Int. Cl.$^4$ .............................................. F41D 7/04
[52] U.S. Cl. ......................................................... 89/12
[58] Field of Search ................... 89/1.41, 12, 126, 127

[56] References Cited

U.S. PATENT DOCUMENTS

| | | | |
|---|---|---|---|
| 1,843,916 | 2/1932 | Cole | 89/148 |
| 2,632,272 | 3/1953 | Holek | 42/75.02 |
| 3,342,105 | 9/1967 | Fagerstrom | 89/12 |
| 3,568,350 | 3/1971 | Silsby | 42/75.01 |
| 3,897,714 | 8/1975 | Perrin et al. | 89/12 |
| 4,114,510 | 4/1978 | Prince et al. | 89/12 |
| 4,660,457 | 4/1987 | Bühler et al. | 89/12 |

OTHER PUBLICATIONS

Navair, 11-95M61A1-1, 1 Aug. 1969, pp. 1—1, 2-1--2-3, 6-11-6-13, 6-26-6-28, 9-5, 9-10.

*Primary Examiner*—Stephen C. Bentley
*Attorney, Agent, or Firm*—Werner W. Kleeman

[57] ABSTRACT

The holding or clamp apparatus for the barrel cluster of a multi-barrel firing weapon, in particular, a Gatling type gun, is constructed such that a quick and easy replacement of the weapon barrels without the use of tools is possible. Up to now, each weapon barrel was secured by threaded connections. According to the invention, a locking ring is rotatably mounted at a substantially ring-shaped barrel support. This locking ring can be selectively locked in two positions on the substantially ring-shaped barrel support. In its first position, each one of its cams project into a recess of the associated weapon barrel and thereby secure the substantially ring-shaped barrel support against axial displacement with respect to the weapon barrels. Each weapon barrel contains a polygonal, such as a square section, which is embraced by holding claws or clamps of the barrel support, thereby securing such weapon barrel against unintended rotation about its own lengthwise axis.

4 Claims, 2 Drawing Sheets

HOLDING APPARATUS FOR WEAPON BARRELS OF A MULTI-BARREL FIRING WEAPON

BACKGROUND OF THE INVENTION

The present invention broadly relates to a holding or clamp apparatus or assembly, and, in particular, relates to a new and improved construction of a holding or clamp apparatus for weapon barrels of a multi-barrel firing weapon provided with a substantially ring-shaped barrel support or mount for receiving the weapon barrels.

In its more particular aspects, the present invention concerns itself with a holding or clamp apparatus wherein, for instance, six weapon barrels of a firing weapon can be held in position at their front and rear ends. The weapon barrels form a cluster, whereby all their lengthwise axes are arranged on an imaginary cylinder at the same distance from a central axis and at the same distance from each other.

For such a firing weapon, the individual weapon barrels should be easily replaceable without the necessity of screws or threaded bolts or the like, which are easily lost in operation, being loosened and without the need for tools for loosening and tightening the weapon barrels in the holding apparatus. On the other hand, a reliable fixing of the weapon barrels at the holding apparatus must be guaranteed, as the barrel cluster rotates during weapon firing and large centrifugal forces arise.

Holder or clamp apparatuses or assemblies for weapon barrels are known from prior art constructions. In U.S. Pat. No. 3,897,714, granted Aug. 5, 1975 and U.S. Pat. No. 4,114,510, granted Sept. 19, 1976, holder or clamping apparatuses or assemblies for weapon barrel clusters are described, whereby screws or threaded bolts are used to fasten the individual weapon barrels to a ring or a disk. This is necessary when precise focusing of the weapon barrels is desired.

As mentioned previously, however, these prior art arrangements have the disadvantage that easy replacement of the weapon barrels is not guaranteed.

It is usual to fasten a single weapon barrel in the weapon casing or housing with the aid of a bayonet lock. If, however, there are present several weapon barrels, then a separate bayonet lock is needed for each single weapon barrel, so that the replacement of the weapon barrels requires a relatively large amount of time.

SUMMARY OF THE INVENTION

Therefore with the foregoing in mind, it is a primary object of the present invention to provide a new and improved construction of a holding or clamp apparatus for weapon barrels of a multi-barrel firing weapon which does not exhibit the aforementioned drawbacks and shortcomings of the prior art constructions.

Another and more specific object of the present invention aims at the provision of a new and improved construction of a holding or clamp apparatus for weapon barrels which does not have the disadvantages mentioned above and which allows the holding or clamp apparatus to be easily set up or removed.

Yet a further significant object of the present invention aims at providing a new and improved construction of a holding or clamp apparatus for weapon barrels of a multi-barrel firing weapon, which is relatively simple in construction and design, extremely economical to manufacture, highly reliable in operation, easy and quick to use, not readily subject to breakdown or malfunction and requires a minimum of maintenance and servicing.

Now in order to implement these and still further objects of the invention, which will become more readily apparent as the description proceeds, the holding or clamp apparatus of the present invention is manifested by the features that a locking ring is rotatably mounted at the weapon barrel support, that the locking ring can be selectively locked in two positions at the weapon barrel support, that in one of the two positions of the locking ring, the barrel support is secured against axial displacement at the weapon barrels and that in the other of these two positions of the locking ring, the weapon barrels in the barrel support are replaceable.

An essential advantage of this inventive holding or clamp apparatus is that with the rotation of a single locking ring all weapon barrels are positively positionally locked and that each individual weapon barrel does not need to be separately locked.

Preferably, the locking ring contains cams or dogs or equivalent structure, which engage locking grooves of the weapon barrels in one position of the locking ring. Preferably radially displaceable or slidable, spring-loaded locking elements, such as locking bolts, are arranged in the locking ring and which extend into a first recess of the weapon barrel support in a first position of the locking ring and into a second recess of the weapon barrel support in a second position of the locking ring. The locking ring is preferably held at the weapon barrel support by means of a bayonet lock or joint. Finally, the weapon barrel support preferably contains holding claws or clamps, which embrace or engage polygonal sections, such as square sections of the associated weapon barrel, so as to secure each such weapon barrel against an unintended or unintentional rotation about its longitudinal or lengthwise axis.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
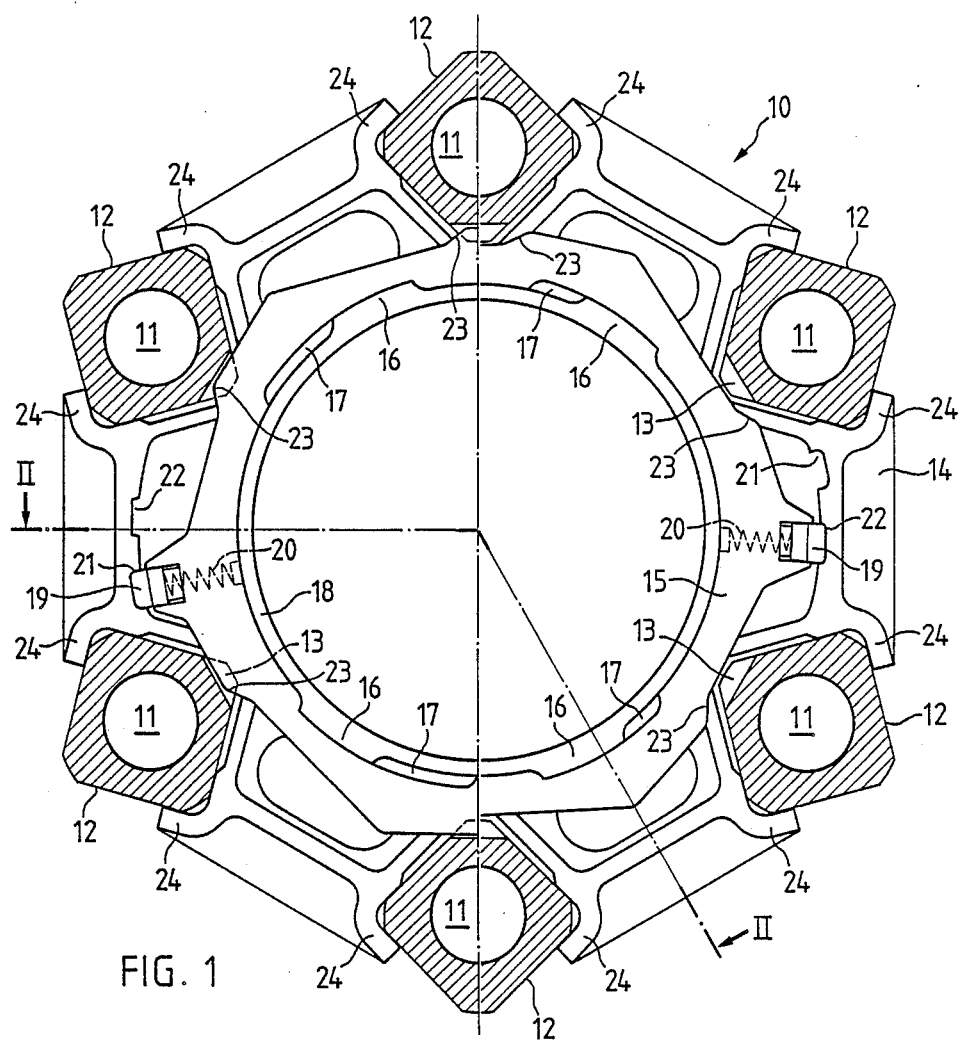
FIG. 1 illustrates a view of the complete holding or clamp apparatus from the front, whereby the holding or clamp apparatus is shown in an unlocked position in the right half, and in a locked position in the left half of this illustration.
Figure 2:
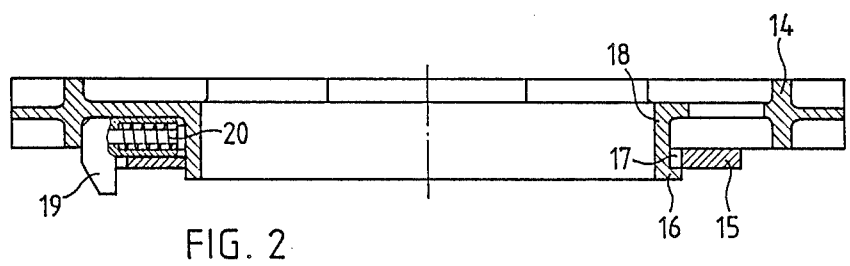
FIG. 2 is a section taken substantially along the line II—II in FIG. 1.

Describing now the drawings, it is to be understood that to simplify the showing thereof, only enough of the construction of the holding or clamp apparatus for the weapon barrels of a multi-barrel firing weapon has been illustrated therein as is needed to enable one skilled in the art to readily understand the underlying principles and concepts of the present invention. Turning now specifically to FIGS. 1 and 2 of the drawings, the structure illustrated therein by way of example and not limitation, will be seen to comprise a holding or clamp apparatus 10 serving to hold or clamp, for instance, six weapon barrels 11 each of which exhibit a polygonal cross-sectional configuration or section, such as a square section or cross-section 12 in the region of the holding apparatus 10. At each of these square sections 12 there is provided a locking groove 13 with which the holding apparatus 10 engages in order to prevent an axial displacement of the associated weapon barrel 11. This holding or clamp apparatus 10 is especially suited for holding or clamping the six weapon barrels 11 at their front region.

The holding apparatus 10 comprises a substantially ring-shaped weapon barrel support or mount 14 and a locking member in the form of, for instance, a locking ring 15, as best seen by referring to FIG. 2. The locking ring 15 is rotatably mounted at the weapon barrel support or mount 14 and is held in position by four cams or dogs 16 of the weapon barrel support or mount 14. So that the locking ring 15 can be set-up or mounted on the weapon barrel support 14, the locking ring 15 contains four recesses 17. These four recesses 17 of the locking ring 15 are somewhat larger than the four cams or dogs 16 of the weapon barrel support 14 so that in a certain position of the locking ring 15, the locking ring 15 can be pushed onto a flange or flange member 18 of the weapon barrel support 14. After this mounting of the locking ring 15 on the flange or flange member 18, the locking ring 15 can be rotated on the weapon barrel support or mount 14, so that in the manner of a bayonet lock, it is locked onto the weapon barrel support or mount 14 and can no longer fall down.

Two locking elements such as locking bolts 19 are arranged on the locking ring 15 so that they can slide or displace radially. Within the locking bolt 19 there is located a spring 20 which is supported at one end on the flange or flange member 18 and at the other end at the locking bolt 19. Each spring 20 strives to push the associated locking bolt 19 radially outwardly. Each locking bolt 19 can engage an associated first recess 21, as depicted at the left-hand side of FIG. 1, or in an associated second recess 22 as depicted at the right-hand side of FIG. 1. In this way, the locking ring 15 is secured against unintentional rotation with respect to the weapon barrel support or mount 14.

The locking ring 15 has, for example, six cams or dogs 23 which either, as depicted in FIG. 1 at the left-hand side, engage the aforementioned locking grooves 13 or as depicted in FIG. 1 at the right-hand side, are located outside the locking grooves 13 of the weapon barrels 11.

The weapon barrel support or mount 14 possesses, for instance, twelve holding claws or clamps 24 each of which embrace or engage the associated polygonal or square section 12 of the related weapon barrel 11 and secure each such weapon barrel 11 against unintentional rotation about its own lengthwise axis. The aforementioned cams or dogs 23 which engage the locking grooves 13 of the weapon barrels 11, secure the weapon barrel support or mount 14 against an unintentional displacement in the axial direction. To lock or unlock the weapon barrels 11 in the holding or clamp apparatus 10, it is sufficient to slide the two locking bolts 19 radially inwards against the force of the related spring 20 and to turn the locking ring 15 either clockwise with respect to the weapon barrel support or mount 14 until each such locking bolt 19 engages the associated recess 22, or anticlockwise until each such locking bolt 19 engages the other associated recess 21.

Figure 3:
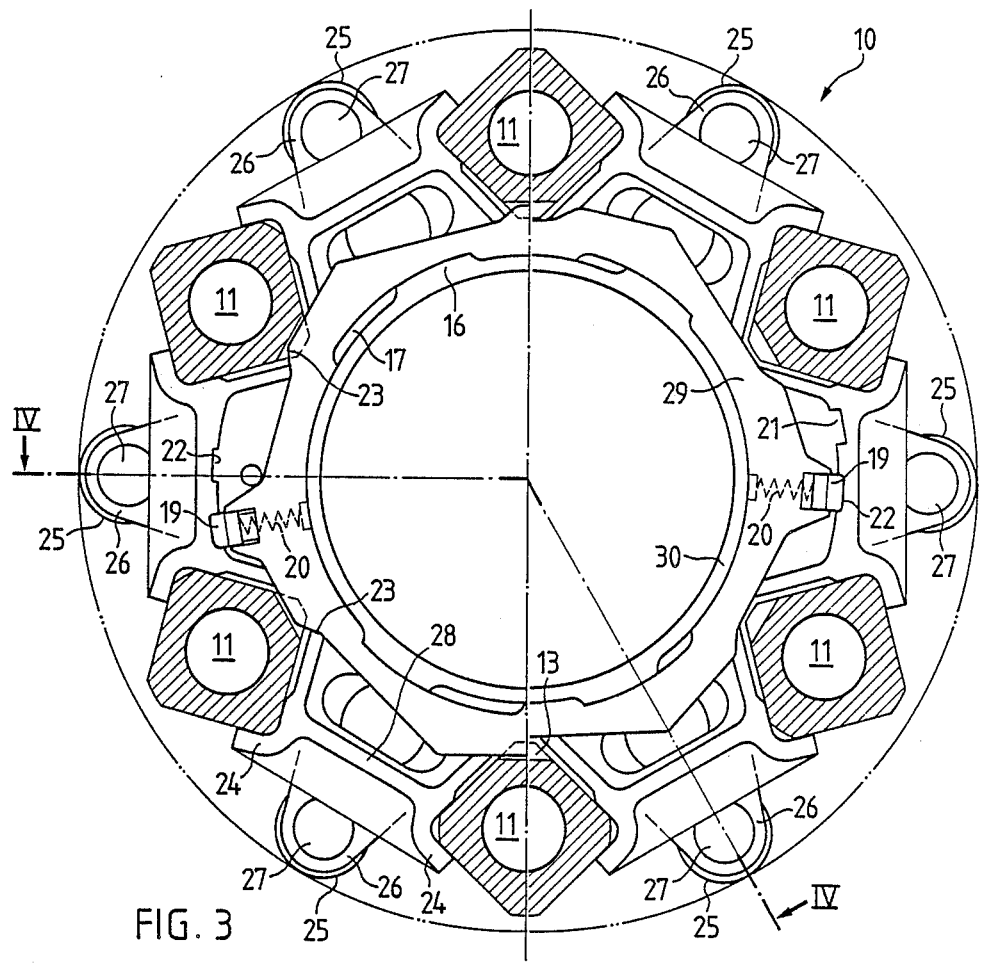
FIG. 3 illustrates another exemplary embodiment of the holding or clamp apparatus in front view, whereby the holding or clamp apparatus is shown in a locked position in the left half, and in an unlocked position in the right half of this illustration.
Figure 4:
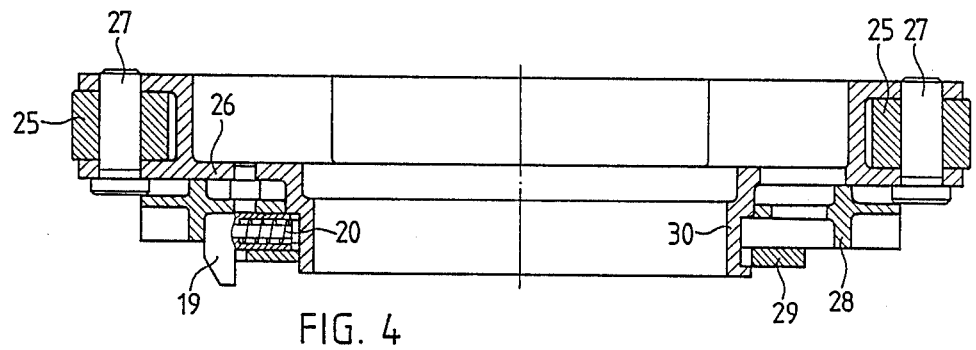
FIG. 4 is a section taken substantially along the line IV—IV in FIG. 3.

The second exemplary embodiment of the holding or clamp apparatus 10, depicted in FIGS. 3 and 4, differs from the first exemplary embodiment of the holding or clamp apparatus 10, depicted in FIGS. 1 and 2, essentially in that here six rollers or rolls 25 are rotatably mounted at the weapon barrel support or mount, which is here designated in FIGS. 3 and 4 by reference numeral 28. This embodiment of holding or clamp apparatus 10 is particularly suited for holding or clamping the weapon barrels 11 at the rear region thereof. As illustrated in FIG. 3, and especially in FIG. 4, this second embodiment of holding or clamp apparatus 10 comprises a holder or holder portion 26 associated with each weapon barrel 11 and on which the rollers or rolls 25 are rotatably mounted on bolts 27 or the like. The weapon barrel support or mount 28 and a locking element in the form of a locking ring 29 are located at these holders 26. This weapon barrel support 28 and this locking ring 29 are rotatably mounted on a flange 30 of the holders 26. All other parts of the holding or clamp apparatus 10 of the exemplary embodiment represented in FIGS. 3 and 4, correspond to the first exemplary embodiment of FIGS. 1 and 2. These identical or analogous parts are therefore also conveniently labelled with the same reference numerals. The rollers or rolls 25 enable the barrel cluster formed of the six weapon barrels 11 to rotate in a casing or housing, not shown.

While there are shown and described present preferred embodiments of the invention, it is to be distinctly understood that the invention is not limited thereto, but may be otherwise variously embodied and practiced within the scope of the following claims. Accordingly,

What we claim is:

1. A holding apparatus for weapon barrels of a multi-barrel firing weapon, comprising:
   a substantially ring-shaped weapon barrel support for receiving the weapon barrels;
   a locking ring rotatably mounted at said substantially ring-shaped weapon barrel support for movement into at least two preselected positions;
   means for selectively locking said locking ring in each one of said at least two preselected positions such that in one of said at least two preselected positions of the locking ring the substantially ring-shaped weapon barrel support is secured against axial displacement at the weapon barrels;
   said means for selectively locking said locking ring locking said locking ring in an other one of said at least two preselected positons such that weapon barrels are replaceable in said substantially ring-shaped weapon barrel support;
   said substantailly ring-shaped weapon barrel support contains first recess means and second recess means;
   said means for selectively locking said locking ring comprises radially slidably, spring-load locking bolts arranged at said locking ring;
   said spring-loaded locking bolts engaging into said first recess means of said substantially ring-shaped weapon barrel support when the locking ring assumes said one position of said at least two preselected positions;

said spring-loaded locking bolts engaging into said second recess means of said substantially ring-shaped weapon barrel support when the locking ring assumes said other position of said at least two preselected positions; and bayonet lock means for retaining said locking ring at said substantially ring-shaped weapon barrel support.

2. The holding apparatus as defined in claim 1, wherein:

each of said barrels is provided with a locking groove;

said locking ring being provided with cams;

said cams, when said locking ring is selectively locked in said one of said at least two preselected positions, engaging in said locking grooves of said weapon barrels.

3. The holding apparatus as defined in claim 1, further including:

holder means cooperating with said substantially ring-shaped weapon barrel support; and rollers means carried by said holder means for enabling rotational mounting of said weapon barrels in a housing.

4. A holding apparatus for weapon barrels of a multi-barrel firing weapong, comprising:

a substantailly ring-shaped weapon barrel support for receiving the weapon barrels;

a locking ring rotatably mounted at said substantially ring-shaped weapon barrel support for movement into at least two preselected positions;

means for selectively locking said locking ring in each one of said at least two preselected positions such that in one of said at least two preselected positions of the locking ring the substantially ring-shaped weapon barrel support is secured against axial displacement at the weapon barrels;

said means for selectively locking said locking ring locking said locking ring in an other one of said at least two preselected positions such that weapon barrels are replaceable in said substantially ring-shaped weapon barrel support;

said substantially ring-shaped weapon barrel support contains first recess means and second recess means;

said means for selectively locking said locking ring comprises radially slidable, spring-loaded locking bolts arranged at said locking ring;

said spring-loaded locking bolts engaging into said first recess means of said substantially ring-shaped weapon barrel support when the locking ring assumes said one position of said at least two preselected positions;

said spring-loaded locking bolts engaging into said second recess means of said substantially ring-shaped weapon barrel support when the locking ring assumes said other position of said at least two preselected positions;

each of said weapon barrels has a polygonal section and a lengthwise axis; and said substantially ring-shaped weapon barrel support contains holding claws which engage the polygonal sections of said weapon barrels in order to secure each said weapon barrel against unintentional rotation about its lengthwise axis.

* * * * *

UNITED STATES PATENT OFFICE
CERTIFICATE OF CORRECTION

PATENT NO. : 4,735,125

DATED : April 5, 1988

INVENTOR(S) : ERWIN BOHLER and WERNER BRUDERER

It is certified that error appears in the above-identified patent and that said Letters Patent are hereby corrected as shown below:

Column 5, line 30, please delete "weapong" and insert
   --weapon--

Column 5, line 31, please delete "substantailly" and insert
   --substantially--

Signed and Sealed this

Twenty-seventh Day of September, 1988

Attest:

DONALD J. QUIGG

*Attesting Officer*  *Commissioner of Patents and Trademarks*